3,152,951
GERMICIDAL COMPOSITION OF IODINE AND
LIQUID LANOLIN
Samuel Donald Perlman, 50 Franklin St.,
Worcester, Mass.
No Drawing. Filed Nov. 18, 1960, Ser. No. 70,105
3 Claims. (Cl. 167—17)

This invention relates to antiseptics and provides a novel germicidal agent which may be topically applied either to destroy microorganisms already present or to provide a barrier to sepsis following application. In another aspect, this invention comprises iodine in a medium permitting its use under conditions and at concentrations which have heretofore not been practicable for iodine.

Of the great number of antiseptic materials known, iodine is recognized as one of the most potent and effective. Its usefulness is limited however by its tendency to irritate and also by its relatively high volatility and solubility. Thus iodine has not attained widespread use where prolonged germicidal action is required or where its irritative properties are objectionable. Complexes of iodine that avoid some of these disadvantages are known, but none of them provides an antiseptic that is both long lasting and non-irritating.

This invention provides an iodine base antiseptic having powerful germicidal action without irritating. This antiseptic is also a soothing liquid lotion which supplements the natural oiliness of the skin while providing a long lasting barrier to infection. It is moreover highly penetrating, thus capable of deep reaching effect, without blocking the pores nor being subject to being rubbed off.

I have found that by combining iodine with liquid lanolin the irritative properties of the iodine are eliminated and an effective long-lasting soothing antiseptic lotion is formed. Even when as much as 25 percent by weight of iodine is present in the iodized lanolin, it may be applied directly to the body without discomfort, but generally compositions containing lesser amounts, e.g. about 1–5 percent or less, are most suitable.

Lanolin is the fat-like secretion of the sebaceous glands of sheep which is obtained generally from wool fibers, and is known also as "wool fat." It consists of a complex mixture of esters of the so-called lanolin alcohols, together with minor amounts of free alcohols and lesser amounts of fatty acids and hydrocarbons, and includes both liquid and solid fractions. The liquid fraction is commonly known as "liquid lanolin" and is commercially available by that name. In the iodized lanolin of this invention, the liquid fraction is free of the normally solid constituents of lanolin is used to produce a liquid lotion that may be easily and soothingly applied to the skin, and which, because of its freedom from the solid lanolin constituents, is readily absorbed and highly penetration.

The iodized liquid lanolin may be applied directly to areas to be treated or may be mixed with solvents or carriers for compounding with other materials. A particularly useful form of the antiseptic of this invention is as an aerosol, for which purpose it is mixed with liquefied propellant gases.

The preparation of the iodine-lanolin composition is carried out by reacting the iodine and liquid lanolin directly by slowly adding fine iodine crystals to the liquid lanolin, while maintaining the liquid lanolin at an elevated temperature and stirring during the addition.

A preferred procedure is as follows:

| | Parts by weight |
|---|---|
| Liquid lanolin (Viscolan, a product of American Cholesterol Products, Inc. | 98 |
| Iodine, crystals, finely ground | 2 |

The liquid lanolin is heated in a glass container, with constant stirring, to 85° C. and then cooled to 75° C. to assure uniform temperature throughout. The iodine is then added at the rate of one-quarter part per hour while the temperature is maintained at 75° C. and the mixture is stirred constantly during the addition of the iodine and for about one hour after all the iodine has been added.

The mixture is then cooled and is ready for use.

The product is an oily liquid having a light brown color and a mild odor suggestive of iodine. It may be applied to the body directly as a soothing lotion. It is insoluble in both water and alcohol, and when applied to the skin, its presence is lasting and provides an effective barrier to subsequent infection.

The iodized liquid lanolin may also be combined with non-toxic carriers such as mineral oil, in which it is soluble, and other pharmaceutical or cosmetic bases and solvents.

When the iodized liquid lanolin is to be packaged as an aerosol under pressure, it is preferably compounded with an iodine content of 4 percent by weight by the same procedure described above. It is then dissolved in four times its weight of a conventional liquefied propellant, e.g., those sold under the trademark Freon, and packaged as an aerosol in the conventional manner.

The formulations may be modified within wide ranges, depending on the strength of iodine desired. As little as ¼ of 1 percent of iodine provides a useful germicide, but larger amounts give longer lasting action and provide more efficaceous germicides. The product is effective against many types of microorganisms including Staphylococcus phage types 80 and 81, *Escherichia coli*, and Trichophyton. Application to the hands of workers operating in food processing, electroplating, and other industries where minor infections may be prevalent has reduced drastically the incidence of infection.

I do not know precisely the mechanism of the reaction between iodine and liquid lanolin or the chemical structure of the product that is formed. Since lanolin and its liquid fraction are both complex mixtures of several different compounds, the iodized product of this invention is thought also to be a complex mixture in which the iodine is present either in chemical combination with one or more of the constituents or in some kind of physical association which counteracts the irritative properties of iodine. I have accordingly designated this product as iodized liquid lanolin and also as the reaction product of liquid lanolin and iodine but do not thereby imply that the iodine is in either physical or chemical combination with the lanolin, as I have not pursued my researches that far. Also, although I have described the product as having the germicidal activity of iodine, I do not imply that such activity results entirely, or even party, from free iodine even though from the appearance and odor of iodized liquid lanolin free iodine is assumed to be present. My discovery is simply that iodine mixed with liquid lanolin results in a germicidal agent that is superior in many regards to other forms of iodine. I contemplate that further researches will yield more knowledge of the precise nature of the product, and of particular constituents that are more or less effective, and consider that to the extent such constituents are suggested by this teaching, they come within the scope of this invention.

This application is a continuation-in-part of my pending application, Serial No. 949, filed January 7, 1960, now abandoned.

Having thus disclosed my invention, I claim and desire to secure by Letters Patent:

1. As a germicidal agent, the reaction product of iodine and the liquid fraction of lanolin free of normally solid lanolin constituents, containing from ¼ percent to 25 percent iodine, by weight.

2. A germicidal composition consisting essentially of the reaction product of iodine and the liquid fraction of lanolin free of normally solid lanolin constituents, containing from ¼ percent to 25 percent iodine by weight, and a non-toxic carrier therefor, said reaction product being present in an amount effective for germicidal activity.

3. The method of killing microorganisms on a living body comprising applying the reaction product of iodine and the liquid fraction of lanolin free of normally solid lanolin constituents, containing from ¼ percent to 25 percent iodine by weight, to said body.

References Cited in the file of this patent

UNITED STATES PATENTS 2,776,924    Martin _____ Jan. 8, 1957

OTHER REFERENCES

Goodman: "Cosmetic Dermatology," 1st Ed., 1936, McGraw-Hill, New York, p. 214.

Osol: American Druggist, December 1937, p. 30.

U.S. Dispensatory, 25th Ed. (1957), pp. 1510–1511.